(12) United States Patent
Hattori

(10) Patent No.: US 9,343,943 B2
(45) Date of Patent: May 17, 2016

(54) ROTATING ELECTRIC MACHINE AND METHOD FOR CONTROLLING THE ROTATING ELECTRIC MACHINE

(75) Inventor: Hiroyuki Hattori, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/234,646

(22) PCT Filed: Jul. 25, 2012

(86) PCT No.: PCT/IB2012/001435
§ 371 (c)(1),
(2), (4) Date: Jan. 24, 2014

(87) PCT Pub. No.: WO2013/014523
PCT Pub. Date: Jan. 31, 2013

(65) Prior Publication Data
US 2014/0191696 A1 Jul. 10, 2014

(30) Foreign Application Priority Data

Jul. 28, 2011 (JP) .................................. 2011-165220

(51) Int. Cl.
| H02P 31/00 | (2006.01) |
| H02K 9/19 | (2006.01) |
| H02K 11/00 | (2006.01) |
| H02K 31/00 | (2006.01) |

(52) U.S. Cl.
CPC .............. *H02K 9/19* (2013.01); *H02K 11/0047* (2013.01); *H02K 11/25* (2016.01); *H02K 31/00* (2013.01)

(58) Field of Classification Search
CPC ............... B60K 2007/0038; B60K 2007/0092; B60K 6/48; B60K 7/007; H02P 29/0055; H02P 23/14; H02P 25/026; H02P 29/044; Y02T 10/641
USPC ............ 318/471, 473, 480; 310/52–54, 68 B, 310/68 C
See application file for complete search history.

(56) References Cited

U.S. PATENT DOCUMENTS

| 5,217,085 | A  | * | 6/1993 | Barrie et al. ................ 184/104.1 |
| 7,462,963 | B2 | * | 12/2008 | Ishihara et al. .................. 310/58 |
| 7,528,511 | B2 | * | 5/2009 | Smith .......................... 310/68 C |
| 7,603,969 | B2 | * | 10/2009 | Repple et al. ................. 123/41.1 |
| 7,815,368 | B2 | * | 10/2010 | Sasaki et al. .................. 374/152 |

(Continued)

FOREIGN PATENT DOCUMENTS

| JP | 2003-92858 | 3/2003 |
| JP | 2008-178243 | 7/2008 |

(Continued)

*Primary Examiner* — Paul Ip
(74) *Attorney, Agent, or Firm* — Finnegan, Henderson, Farabow, Garrett & Dunner, LLP

(57) ABSTRACT

A rotary electric machine includes a rotor that is arranged such that an axis of rotation of the rotor extends in a horizontal direction, a stator that is provided with an coil end on which coolant is supplied from a position above the coil end in a direction of gravitational force, and a temperature sensor that is arranged on an outer peripheral face of the coil end at a position near a horizontal plane that includes the axis of rotation of the rotor. When the flow rate of the coolant is below a threshold the temperature sensor measures the coil temperature. When the flow rate of the coolant is above a threshold, so that coolant is in direct contact with the temperature sensor, it measures the coolant temperature.

5 Claims, 7 Drawing Sheets

(56) References Cited

U.S. PATENT DOCUMENTS

| | | | |
|---|---|---|---|
| 8,058,756 B2* | 11/2011 | Yoo et al. | 310/68 B |
| 8,063,519 B2* | 11/2011 | Smith | 310/52 |
| 8,080,909 B2* | 12/2011 | Perkins | 310/64 |
| 8,803,378 B2* | 8/2014 | Sonohara et al. | 310/53 |
| 2002/0157408 A1* | 10/2002 | Egawa et al. | 62/228.1 |
| 2002/0180577 A1* | 12/2002 | Heyden et al. | 338/25 |
| 2003/0016476 A1* | 1/2003 | Yamamoto et al. | 361/25 |
| 2003/0102728 A1 | 6/2003 | Chen et al. | |
| 2006/0113851 A1* | 6/2006 | Ishihara et al. | 310/52 |
| 2007/0199339 A1* | 8/2007 | Ishihara et al. | 62/242 |
| 2008/0001486 A1* | 1/2008 | Smith | 310/52 |
| 2009/0224715 A1* | 9/2009 | Smith | 318/471 |
| 2009/0232185 A1* | 9/2009 | Sasaki et al. | 374/208 |
| 2009/0284202 A1* | 11/2009 | Miura | 318/473 |
| 2010/0259118 A1* | 10/2010 | Kitagawa | 310/54 |
| 2011/0232402 A1* | 9/2011 | Schaefer et al. | 74/399 |
| 2011/0241458 A1* | 10/2011 | Rai et al. | 310/53 |
| 2011/0285220 A1* | 11/2011 | Sonohara et al. | 310/53 |
| 2012/0139369 A1* | 6/2012 | Lendenmann et al. | 310/53 |
| 2012/0181882 A1* | 7/2012 | Chamberlin et al. | 310/53 |
| 2012/0181883 A1* | 7/2012 | Chamberlin et al. | 310/53 |
| 2012/0181965 A1* | 7/2012 | Chamberlin et al. | 318/460 |
| 2012/0181967 A1* | 7/2012 | Fulton et al. | 318/480 |
| 2012/0183247 A1* | 7/2012 | Chamberlin et al. | 384/448 |
| 2012/0313462 A1* | 12/2012 | Hartmann et al. | 310/43 |
| 2013/0069579 A1* | 3/2013 | Uematsu et al. | 318/473 |
| 2013/0106251 A1* | 5/2013 | Kaneshige et al. | 310/68 B |
| 2014/0184031 A1* | 7/2014 | Kaneshige | 310/68 B |

FOREIGN PATENT DOCUMENTS

| | | |
|---|---|---|
| JP | 2009-284718 | 12/2009 |
| JP | 2010-141968 | 6/2010 |
| WO | WO 2011/117985 A1 | 9/2011 |

* cited by examiner

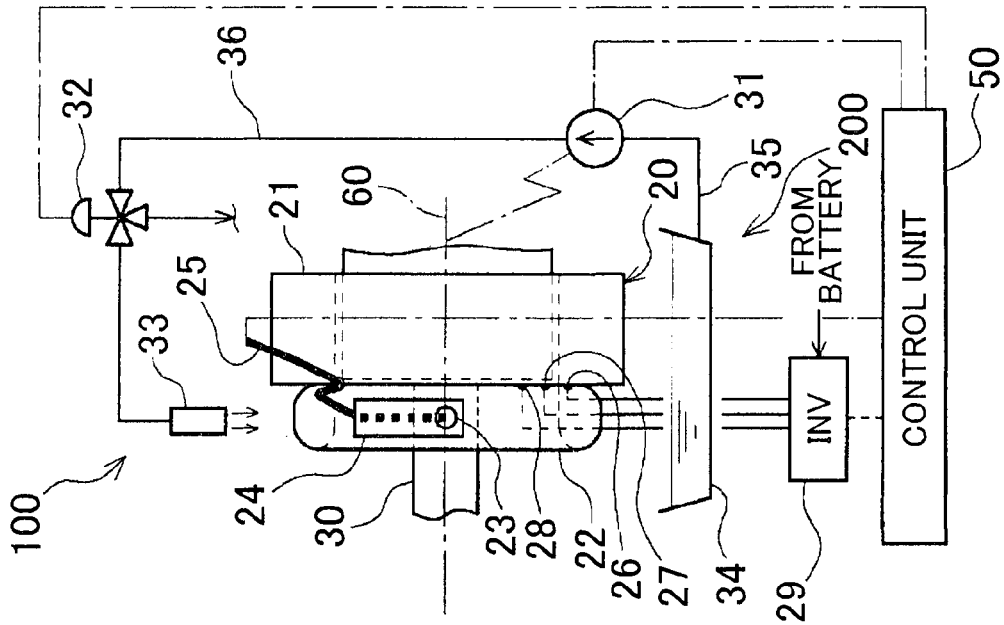
F I G. 2A
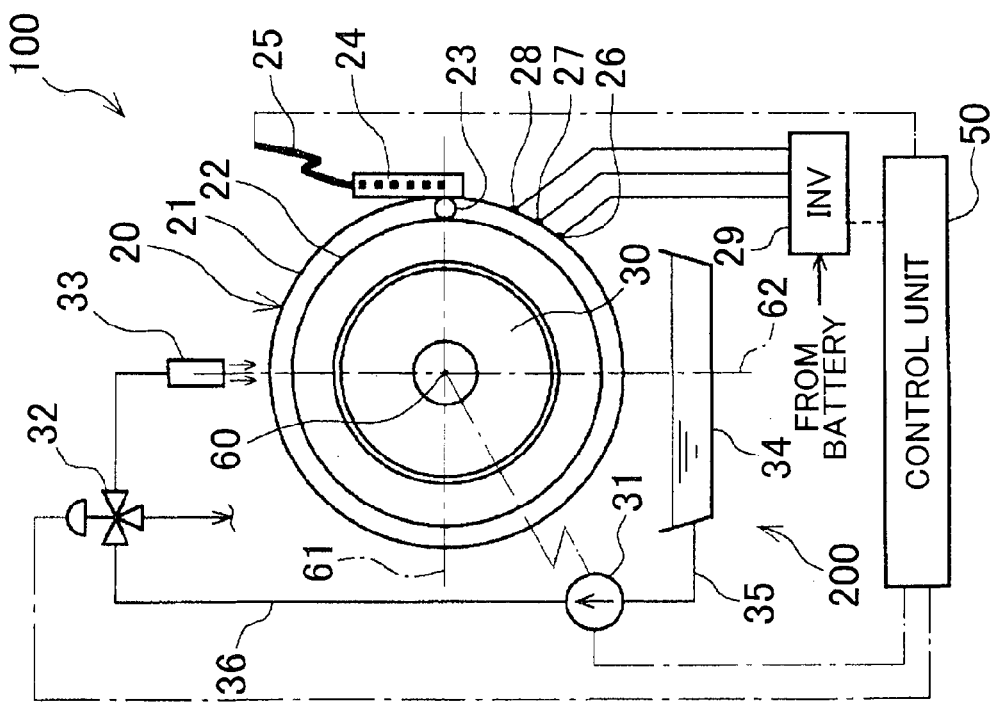
F I G. 2B

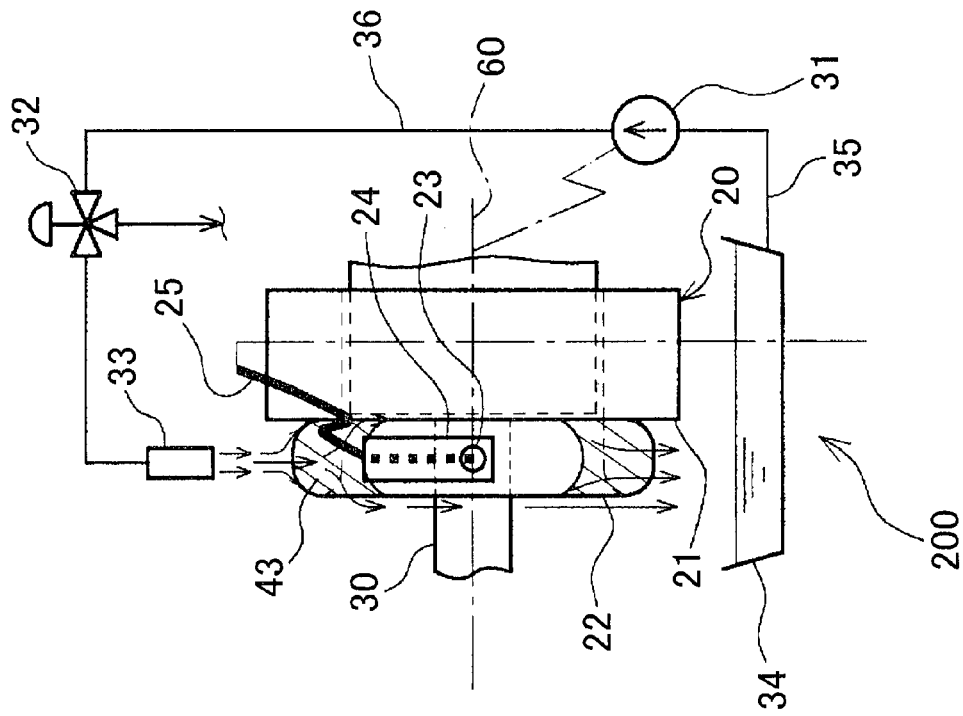
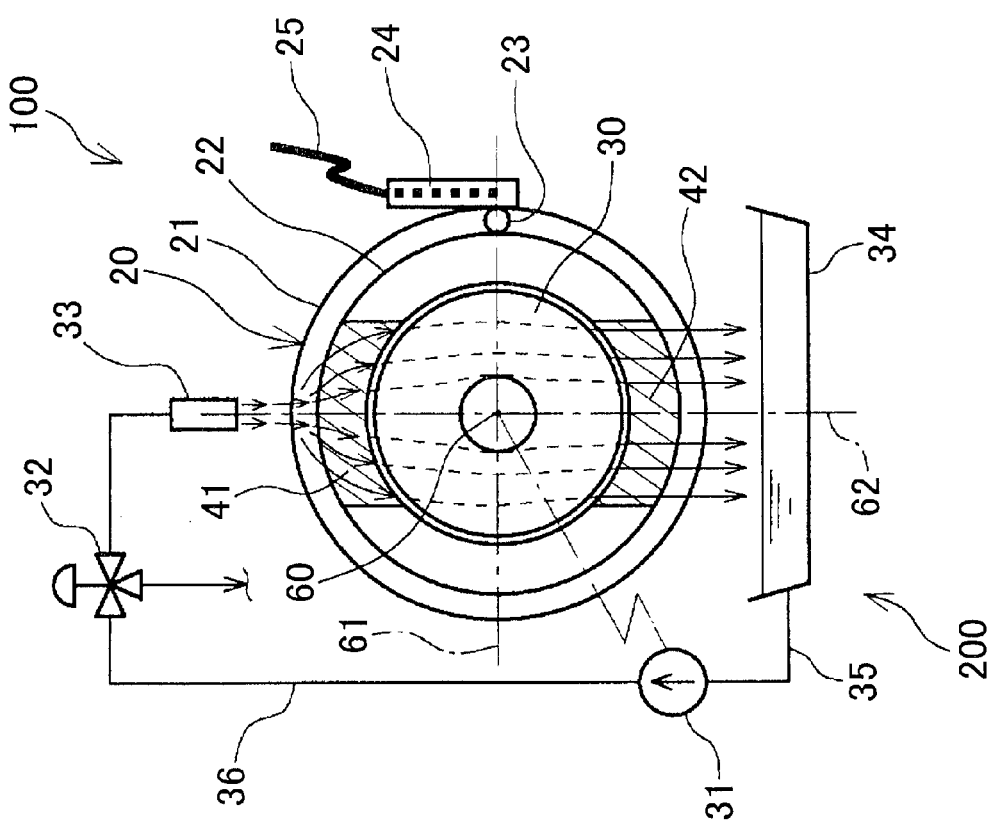

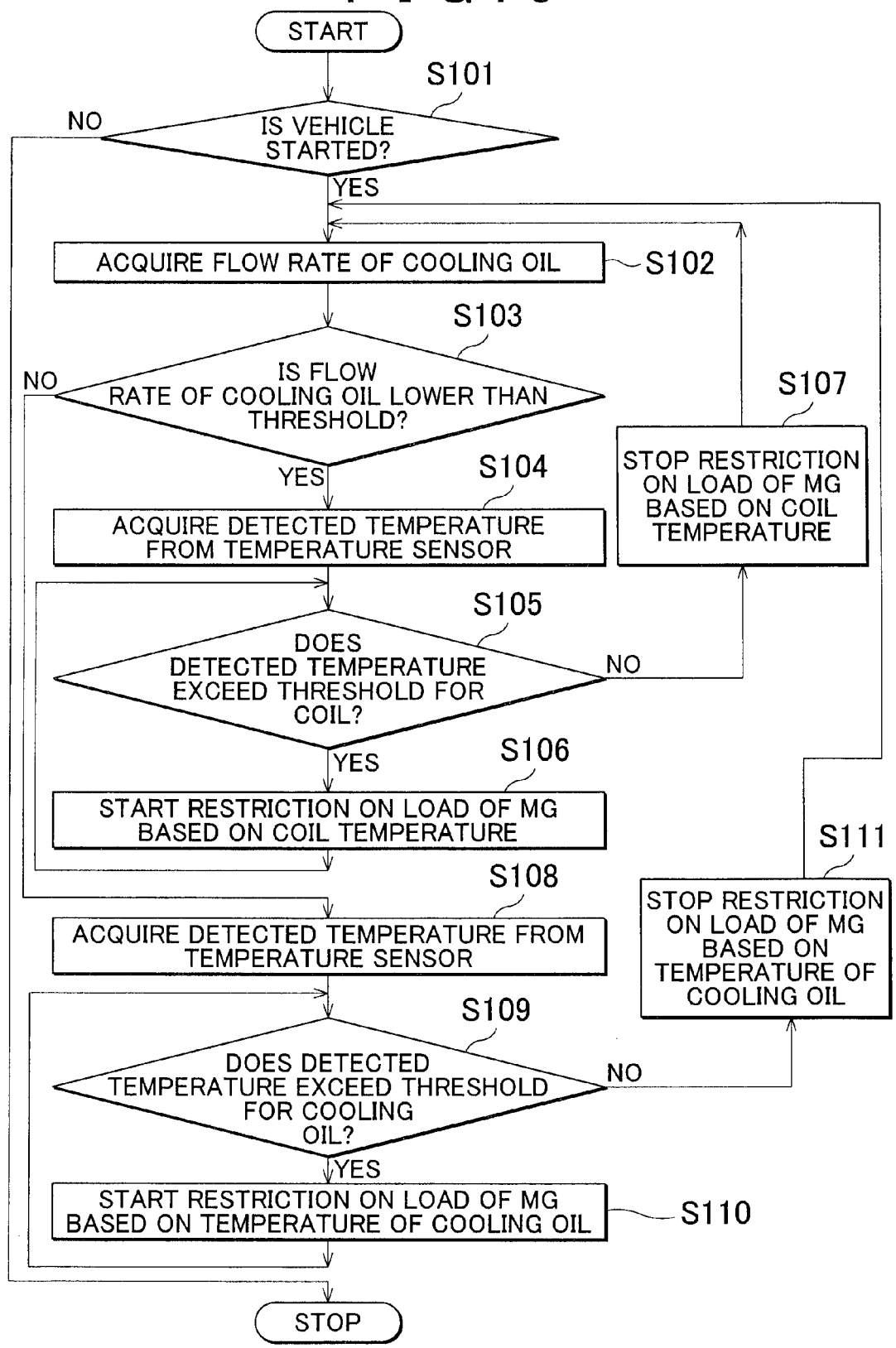

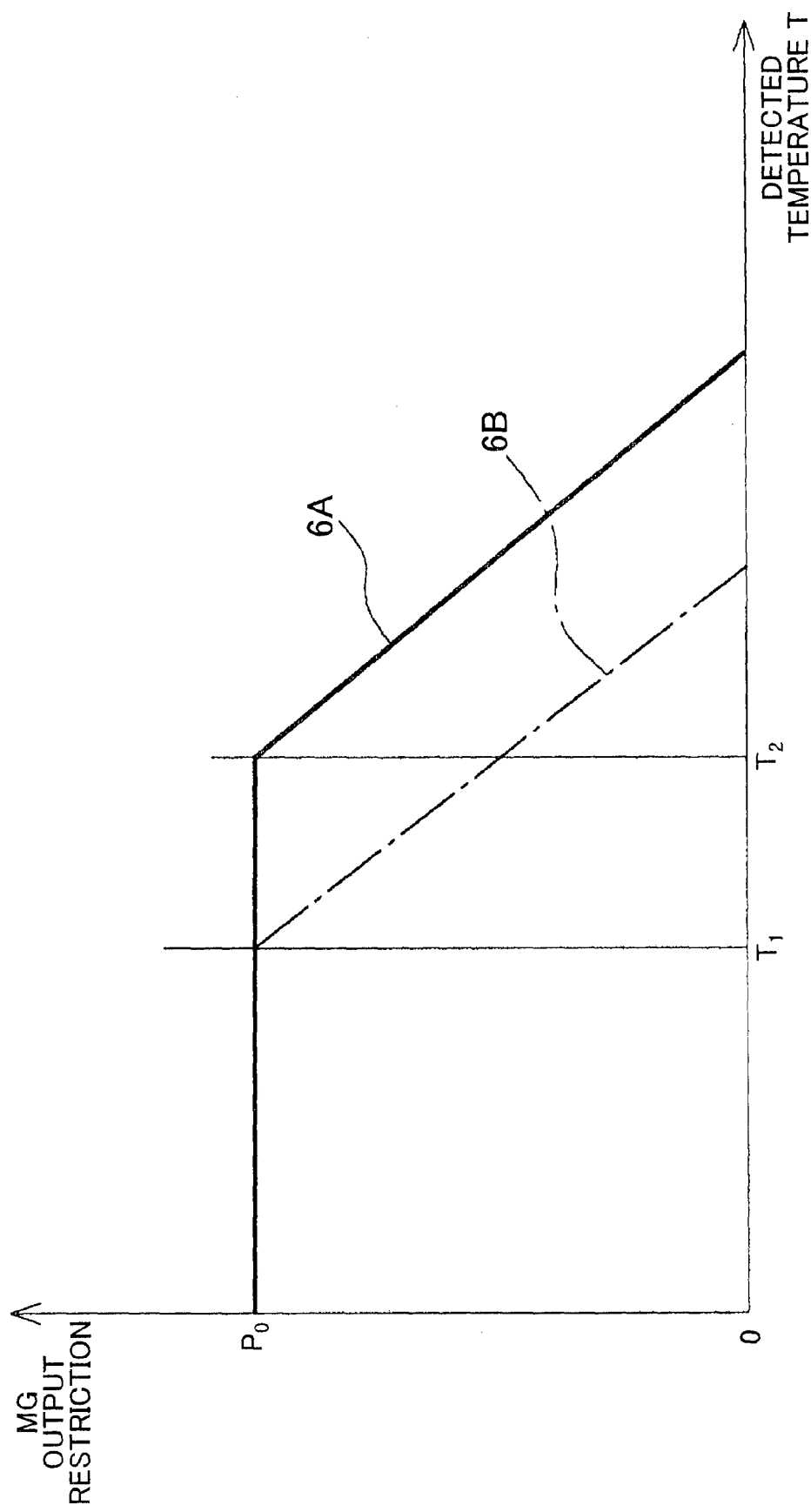

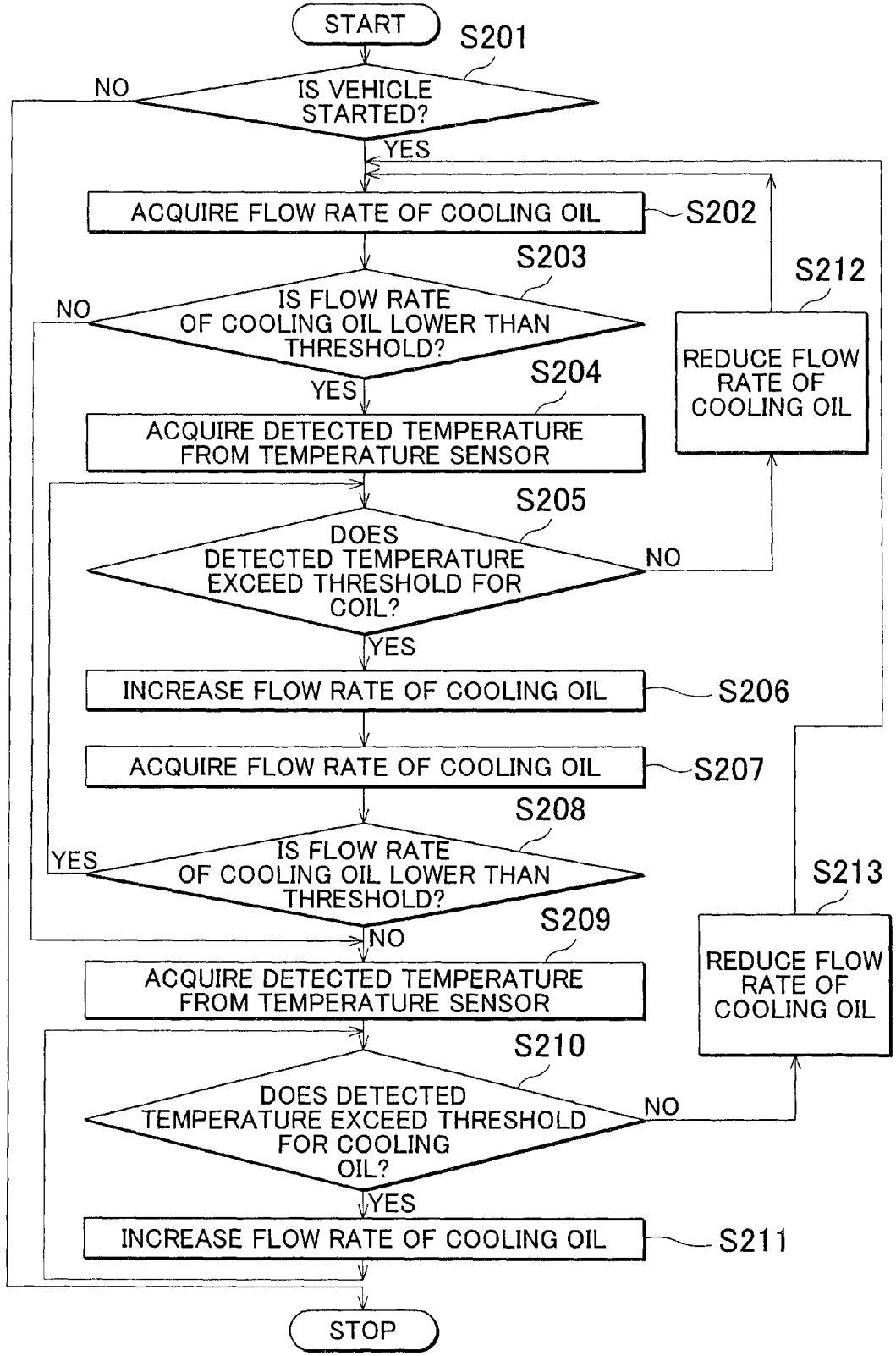

ROTATING ELECTRIC MACHINE AND METHOD FOR CONTROLLING THE ROTATING ELECTRIC MACHINE

CROSS-REFERENCE TO RELATED APPLICATIONS

This application is a national phase application of International Application No. PCT/IB2012/001435, filed Jul. 25, 2012, and claims the priority of Japanese Application No. 2011-165220, filed Jul. 28, 2011, the content of both of which is incorporated herein by reference.

BACKGROUND OF THE INVENTION

1. Field of the Invention

The invention relates to a rotary electric machine, and a method for controlling the rotary electric machine.

2. Description of the Related Art

In rotary electric machines such as electric motors, power generators, and motor generators, the temperature of coils of a stator increases during operation.

Therefore, a method of measuring the temperature of a coil by pressing a temperature sensor against the coil is employed (refer to, for example, Japanese Patent Application Publication No. 2003-92858 (JP 2003-92858 A)). In recent years, alternating-current (AC) motors and alternating-current (AC) motor generators, in which a magnet is embedded in a rotor, have been in widespread use. In this type of rotary electric machine in which a magnet is embedded in a rotor, the temperature of the magnet of the rotor increases during operation. Therefore, a cooling oil passage that extends along the magnet is formed in the rotor, and the magnet is cooled by passage of cooling oil through the cooling oil passage. However, it is difficult to directly measure the temperature of the magnet because the magnet rotates together with the rotor. Therefore, there is proposed the following method. According to the method, cooling oil for a magnet is supplied from an outlet of a cooling oil passage, in the radial direction, toward a temperature sensor fitted to a stator, and the temperature of the cooling oil, which has cooled the magnet and therefore the temperature thereof has increased, is detected by the temperature sensor. In this way, the temperature of the magnet is estimated. According to this method, the flow rate of coolant for the magnet is increased or decreased based on the estimated temperature of the magnet (refer to, for example, Japanese Patent Application Publication No. 2008-178243 (JP 2008-178243 A)).

Also, the following method of cooling a coil end of a stator is employed. According to this method, a cooling oil passage is formed in a rotor, and cooling oil is supplied from the rotor toward the coil end in the radial direction to cool the coil end (refer to, for example, Japanese Patent Application Publication No. 2009-284718 (JP 2009-284718 A)). In this method, providing a guide member that guides the cooling oil to the coil end is proposed so that the cooling oil is effectively supplied to the coil end. JP 2009-284718 A also proposes a method of providing heat protection to the coil end. According to this method, a temperature sensor is fitted to the coil end at a portion that is less likely to contact the cooling oil to detect the highest temperature in the coil end.

In recent rotary electric machines, a method of supplying cooling oil toward a coil end of a stator from a position over the coil end in the vertical direction is often employed to cool the stator further efficiently. In this case, in order to provide heat protection to both of the coil and the cooling oil, a load of the rotary electric machine is restricted to keep the temperature of the coil below a predetermined upper limit temperature and keep the temperature of the cooling oil below a predetermined upper limit temperature. When the flow rate of the cooling oil is changed, it is necessary to control the flow rate of the cooling oil such that the temperature of the coil falls within a predetermined temperature range and the temperature of the cooling oil falls within a predetermined temperature range. For example, the flow rate of the cooling oil is controlled such that the flow rate of the cooling oil is low when the temperature of the coil is low, and the flow rate of the cooling oil is increased with an increase in the temperature of the coil. In addition, when the temperature of the cooling oil itself increases with an increase in the temperature of the coil, the flow rate of the cooling oil is reduced such that the temperature of the cooling oil itself falls below an upper temperature limit. In other words, when the temperature of the cooling oil is low, the flow rate of the cooling oil is determined in accordance with the temperature of the coil, and when the temperature of the cooling oil increases to a certain degree, the flow rate of the cooling oil is determined in accordance with the temperature of the cooling oil itself.

In this case, it is necessary to detect both the temperature of the coil and the temperature of the cooling oil. However, in each of the related arts described in JP 2003-92858 A, JP 2008-178243 A, and JP 2009-284718 A, measuring only one of the temperature of the coil and the temperature of the cooling oil is suggested. Therefore, in order to detect both the temperature of the coil and the temperature of the cooling oil itself, provision of a plurality of temperature sensors is required. This may complicate the configuration.

SUMMARY OF THE INVENTION

The invention provides a rotary electric machine in which heat protection is provided to both a coil and a coolant with a simple configuration, and a method for controlling the rotary electric machine.

An first aspect of the invention relates to a rotary electric machine that includes: a rotor that is arranged such that an axis of rotation of the rotor extends in a horizontal direction; a stator that is provided with an coil end on which coolant is supplied from a position above the coil end in a direction of gravitational force; and a temperature sensor that is arranged on an outer peripheral face of the coil end at a position near a horizontal plane that includes the axis of rotation of the rotor.

The rotary electric machine according to the first aspect of the invention may further include a sensor guide that is arranged on an outside of the temperature sensor in a radial direction of the rotary electric machine, and that extends upward along the direction of gravitational force.

The rotary electric machine according to the first aspect of the invention may further include a first control unit that is configured to restrict a load of the rotary electric machine. The first control unit may restrict the load of the rotary electric machine such that a temperature that is detected by the temperature sensor does not exceed an upper limit temperature of the coil end when a flow rate of the coolant is lower than a predetermined threshold, and restrict the load of the rotary electric machine such that the temperature that is detected by the temperature sensor does not exceed an upper limit temperature of the coolant when the flow rate of the coolant is equal to or higher than the predetermined threshold.

The rotary electric machine according to the first aspect of the invention may further include a second control unit that is configured to increase or decrease the flow rate of the coolant. The second control unit may increase or decrease the flow rate of the coolant such that the temperature that is detected by the temperature sensor does not exceed the upper limit temperature of the coil end when the flow rate of the coolant is lower than the predetermined threshold, and increase or decrease the flow rate of the coolant such that the temperature that is detected by the temperature sensor does not exceed the upper limit temperature of the coolant when the flow rate of the coolant is equal to or higher than the predetermined threshold. Note that, the first control unit and the second control unit maybe integrated into a single control unit.

In the rotary electric machine according to the first aspect of the invention, the sensor guide may be arranged at a position apart from the coil end, and the sensor guide may change a direction of flow of at least part of the coolant that flows on the outer peripheral face of the coil end such that the flow of the at least part of the coolant is directed toward the temperature sensor.

In the rotary electric machine according to the first aspect of the invention, the temperature sensor may measure one of or both of a temperature of a surface of the coil end and a temperature of the coolant.

A second aspect of the invention relates to a method for controlling the rotary electric machine, which rotary electric machine includes: a rotor that is arranged such that an axis of rotation of the rotor extends in a horizontal direction; a stator that is provided with an coil end on which coolant is supplied from a position above the coil end in a direction of gravitational force; and a temperature sensor that is arranged on an outer peripheral face of the coil end at a position near a horizontal plane that includes the axis of rotation of the rotor. The method includes: restricting a load of the rotary electric machine such that a temperature that is detected by the temperature sensor does not exceed an upper limit temperature of the coil end when a flow rate of the coolant is lower than a predetermined threshold; and restricting the load of the rotary electric machine such that the temperature that is detected by the temperature sensor does not exceed an upper limit temperature of the coolant when the flow rate of the coolant is equal to or higher than the predetermined threshold.

In the aspects of the invention, heat protection is provided to both the coil and the coolant with a simple configuration.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2A and FIG. 2B are systematic diagrams showing a control system of the motor generator according to the embodiments of the invention;

FIG. 3A and FIG. 3B are explanatory drawings showing flows of cooling oil when the flow rate of the cooling oil in the motor generator according to the embodiments of the invention is low;

FIG. 5 is a flowchart showing an operation of the motor generator according to a first embodiment of the invention.

FIG. 6 is an example of an output restriction curve for the motor generator according to the first embodiment of the invention; and FIG. 7 is a flowchart showing an operation of the motor generator according to a second embodiment of the invention.

DETAILED DESCRIPTION OF EMBODIMENTS

Figure 1:
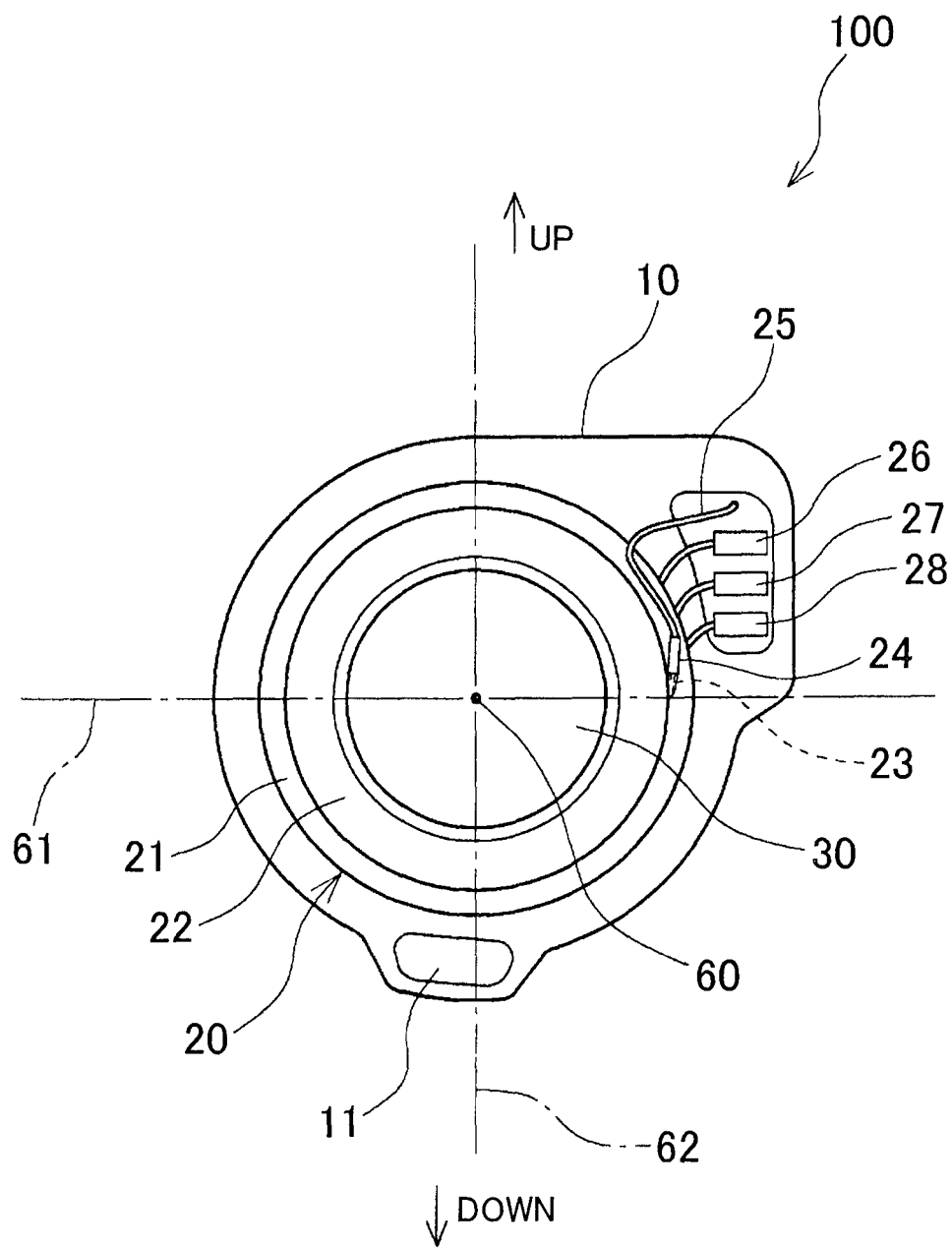
FIG. 1 is an explanatory drawing showing a motor generator according to embodiments of the invention, with a cover on a coil end side removed.

Hereinafter, a first embodiment of the invention will be described with reference to the accompanying drawings. In the following description, a motor generator (MG) 100 will be described as an example of a rotary electric machine. The invention may be applied not only to the motor generator (MG) 100, but also to an electric motor and a power generator. As illustrated in FIG. 1, the motor generator 100 according to the first embodiment includes a casing 10, a stator 20, and a rotor 30. The motor generator 100 is mounted in, for example, an electric vehicle such that an axis 60 of rotation (hereinafter, referred to as "rotation axis 60") of the rotor 30 extends horizontally. In addition, as shown in FIG. 1, a central axis 61 is a horizontal axis that passes through the rotation axis 60, and a central axis 62 is a vertical axis that passes through the rotation axis 60. The stator 20 includes a stator core 21 and a coil end 22. The stator core 21 is provided with wound coils. The coil end 22 projects from an end face of the stator core 21 in the direction of the rotation axis 60 of the rotor 30, and extends over teeth of the stator core 21. The coil end 22 has an annular shape. Upper and lower portions of an outer periphery in a sectional view, which sectional view is taken along a plane that includes the rotation axis 60, is in an arch or generally semicircular shape. Three power terminals 26, 27, 28 are arranged in the casing 10, and the power terminals 26, 27, 28 are connected to the respective phase coils of the stator 20. The power terminals 26, 27, 28 supply three-phase AC power for driving the motor generator 100, or output three-phase AC power generated by the motor generator 100.

A temperature sensor 23 is arranged so as to be in contact with the outer peripheral face of the annular coil end 22, at a position near a plane that includes the horizontal central axis 61 of the stator 20. A sensor guide 24 is fitted to a face of the temperature sensor 23, which is on the opposite side of the temperature sensor 23 from the coil end 22. The sensor guide 24 is arranged so as to extend substantially vertically upward from the temperature sensor 23. A sensor cord 25 is connected to the temperature sensor 23. The sensor guide 24 guides the sensor cord 25 toward the temperature sensor 23 in a direction that is generally along the direction of a tangent to the coil end 22. The sensor guide 24 surrounds the sensor cord 25. The sensor guide 24 may be a generally U-shaped plate member that opens toward the coil end 22, or may be a member that has a box-shaped so as to surround the entire periphery of the sensor cord 25. The sensor cord 25 that extends from the sensor guide 24 is routed along the end face of the stator core 21. Then, the sensor cord 25 is routed toward the outside of the casing 10 from a position adjacent to the power terminals 26, 27, 28.

Note that, FIG. 1 is an explanatory drawing that shows a state where a cover of the casing 10, which is arranged on the coil end 22 side, is removed so that the stator 20 and the rotor 30 accommodated in the casing 10 are visible. Components arranged on the opposite side of the coil end 22 from the stator core 21 in the direction perpendicular to the sheet on which FIG. 1 is drawn are not illustrated. A cooling oil nozzle 33 is arranged at a position over the coil end 22 in the substantially vertical direction. In other words, the cooling oil nozzle 33 is arranged at a position immediately above the coil end 22 in the direction of gravitational force. The cooling oil nozzle 33 supplies cooling oil, which is used as coolant, toward the upper peripheral face of the coil end 22 from a position over the coil end 22 in the substantially vertical direction. Then, the cooling oil supplied from the position over the coil end 22 flows downward along the surface of the coil end 22, and drops into an oil pan (not shown), through a hole 11 formed in a lower portion of the casing 10.

As indicated in FIG. 2, the motor generator 100 according to the first embodiment includes the stator 20 and the rotor 30 that are described above with reference to FIG. 1. The coil end 22 that projects in the direction of the rotation axis 60 is arranged on the end face of the stator 20 in the direction of the rotation axis 60. The temperature sensor 23 is fitted to the peripheral face of the coil end 22, at a position near a horizontal plane that includes the rotation axis 60 of the rotor 30. The temperature sensor 23 is covered with the sensor guide 24 that extends upward along the direction of gravitational force. As illustrated in FIG. 2, a clearance is formed between the sensor guide 24 and the coil end 22. The sensor cord 25 that extends from the temperature sensor 23 is connected to a control unit 50. The temperature detected by the temperature sensor 23 is input into the control unit 50. The power terminals 26, 27, 28 of the motor generator 100 are connected to an inverter 29 via respective power cables. The inverter 29 receives electric power from a secondary battery (not shown) that is able to be charged with electric power and discharge electric power. The electric power from the secondary battery is converted into three-phase AC power for driving the motor generator 100, and is then output to the motor generator 100. On the other hand, the three-phase AC power generated by the motor generator 100 is converted into DC power by the inverter 29, and is then supplied to the secondary battery. The inverter 29 is connected to the control unit 50, and is driven on the basis of a command from the control unit 50.

As illustrated in FIG. 2, the motor generator 100 includes a cooling system 200 configured to cool the coil end 22. The cooling system 200 includes an oil pan 34, a cooling oil pump 31, a three-way valve 32, a cooling oil intake pipe 35, and a cooling oil discharge pipe 36. The oil pan 34 stores the cooling oil that is used as coolant. The cooling oil pump 31 introduces the cooling oil stored in the oil pan 34 to the cooling oil nozzle 33 arranged at the position over the coil end 22 in the substantially vertical direction. The three-way valve 32 adjusts the flow rate of the cooling oil that is supplied from the cooling oil nozzle 33 onto the coil end 22. The cooling oil intake pipe 35 connects the cooling oil pump 31 and the oil pan 34 to each other, The cooling oil discharge pipe 36 is connected to a discharge port of the cooling oil pump 31. The cooling oil pump 31 is connected to the rotor 30, and is rotationally-driven by the rotor 30. The cooling oil pump 31 may be mechanically connected to the rotor 30, and rotate at a rotational speed proportional to the rotational speed of the rotor 30. In other words, the cooling oil pump 31 may be configured such that the flow rate of the cooling oil that is discharged from the cooling oil pump 31 is increased or decreased in proportion to the rotational speed of the rotor 30. Alternatively, the flow rate of the cooling oil that is discharged from the cooling oil pump 31 need not be increased or decreased simply in proportion to the rotational speed of the rotor 30. The rotational speed of the cooling oil pump 31 may be controlled by, for example, a fluid coupling independently of the rotational speed of the rotor 30. When the flow rate of the cooling oil that is discharged from the cooling oil pump 31 is determined based on the rotational speed of the rotor 30, the flow rate of the cooling oil that is supplied onto the coil end 22 may be adjusted by directly returning part of the cooling oil to the oil pan 34 by the three-way valve 32 illustrated in FIG. 2 or by using part of the cooling oil to cool other components. When the flow rate of the cooling oil that is discharged from the cooling oil pump 31 is adjusted independently of the rotational speed of the rotor 30, the cooling oil pump 31 may be connected to the control unit 50, and the flow rate may be increased or decreased on the basis of a command from the control unit 50. Note that, the control unit 50 is a computer that includes a CPU and a memory that stores control programs and control data.

With reference to FIGS. 3A, 3B, FIGS. 4A, 4B, and FIG. 5, an operation of the motor generator 100 when the motor generator 100 according to the first embodiment is mounted in an electric vehicle will be described. As shown in step S101 in FIG. 5, the control unit 50 determines whether the electric vehicle in which the motor generator 100 is mounted is started. Whether the electric vehicle is started may be determined by determining whether an ignition key is turned on or by determining whether a start switch is pushed. When the electric vehicle is started, the control unit 50 acquires the flow rate of the cooling oil that is supplied onto the coil end 22 as shown in step S102 in FIG. 5. The flow rate of the cooling oil may be acquired based on the rotational speed of the rotor 30 when the flow rate of the cooling oil that is discharged from the cooling oil pump 31 is proportional to the rotational speed of the rotor 30. When there is a rotational speed sensor that directly detects the rotational speed of the cooling oil pump 31, the flow rate of the cooling oil may be acquired based on an output from the rotational speed sensor. Alternatively, when the rotational speed of the cooling oil pump 31 is controlled on the basis of a command from the control unit 50, the flow rate of the cooling oil may be acquired based on the command value. Furthermore, the flow rate of the cooling oil may be acquired based on an opening degree signal from the three-way valve 32 illustrated in FIG. 2 in addition to one of the values described above. In other words, when part of the cooling oil discharged from the cooling oil pump 31 is not supplied from the cooling oil nozzle 33 onto the coil end 22, a value obtained by subtracting a flow rate of the cooling oil, which corresponds to the opening degree indicated by the opening signal from the three-way valve 32, from one of the values described above, may be acquired as the flow rate of the cooling oil.

As shown in step S103 in FIG. 5, the control signal 50 compares a signal value acquired according to one of the methods described above with a predetermined threshold to determine whether the flow rate of the cooling oil is lower than the threshold. When the flow rate of the cooling oil is lower than the predetermined threshold, the cooling oil supplied onto the upper peripheral face of the coil end 22 from the cooling oil nozzle 33 drops as indicated by arrows in FIG. 3A. In other words, the cooling oil drops along the surface of the coil end 22 downward from a top portion of the coil end 22, and also drops along the outer peripheral face of the coil end 22 downward from a portion near the top portion along the circumferential direction: Part of the cooling oil dropped from the surface of the upper portion of the coil end 22, which projects in the direction of the rotation axis 60, flows on the surface of the lower portion of the projected coil end 22 while cooling the lower portion of the coil end 22, and drops into the oil pan 34.

As illustrated in FIG. 3B, the coil end 22 is an annular member, and the outer peripheral portion of the coil end 22 has a generally semicircular shape in sectional view taken along the rotation axis 60. Therefore, as indicated by arrows in FIG. 3B, the cooling oil supplied onto the top portion of the coil end 22 flows along the surface of the coil end 22. In other words, the flow of the cooling oil is branched off, at the center of the coil end 22 in its thickness direction, into multiple flows aligned in the direction of the rotation axis 60, and the cooling oil flows toward the end face of the coil end 22, which is on the opposite side of the coil end 22 from the stator core 21, and the end face on the stator core 21 side. When the flow rate of the cooling oil is lower than the predetermined threshold, as illustrated in FIG. 3A and FIG. 3B, the cooling oil flows only on the surface of a hatched region 41 that is a center portion of the coil end 22 in the direction of the central axis 61. On the other hand, the cooling oil does not contact regions of the coil end 22, which are not hatched in FIG. 3A, FIG. 3B. Therefore, the temperature sensor 23 which is in contact with the surface of the region of the coil end 22, on which the cooling oil does not flow, detects the temperature of the coil end 22.

As shown in step S104 in FIG. 5, the control unit 50 acquires the temperature detected by the temperature sensor 23. The control unit 50 recognizes that the flow rate of the cooling oil is lower than the predetermined threshold as described above. Therefore, the control unit 50 determines that the detected temperature is the temperature of the coil end 22, and executes restriction on the load of the motor generator 100 on the basis of the temperature of the coil as shown in steps S105 and S106 in FIG. 5. When the restriction on the load of the motor generator 100 is executed on the basis of the temperature of the coil, the control unit 50 restricts the electric power that is supplied to the motor generator 100 or the electric power that is generated by the motor generator 100 with the use of a restriction curve shown by a line 6A in FIG. 6. As shown by the line 6A in FIG. 6, when the detected temperature does not exceed a temperature $T_2$, which is a predetermined threshold, the electric power that is supplied to motor generator 100 or the electric power that is output from the motor generator 100 is allowed up to a full load $P_0$. On the other hand, when the detected temperature exceeds the predetermined temperature $T_2$, the electric power that is supplied to the motor generator 100 or the electric power that is output from the motor generator 100 is decreased from the full load $P_0$ with an increase in the temperature as indicated by the line 6A. In this case, a load command value for the motor generator 100 is controlled such that the output of the motor generator 100 becomes neither equal to nor larger than the output restricted by the line 6A in FIG. 6 even when the motor generator 100 is required of a larger output due to an increase in the accelerator operation amount or the vehicle speed. Here, the temperature $T_2$ used as the threshold is a load restriction start temperature based on the coil temperature (threshold for the coil temperature). The threshold for the coil temperature may be an upper limit temperature of the coil end 22.

When the control unit 50 starts restriction on the load of the motor generator 100 shown in step S106 in FIG. 5, the control unit 50 returns to step S105 in FIG. 5 to determine whether the temperature detected by the temperature sensor 23 exceeds the predetermined threshold $T_2$. Then, the control unit 50 continues restriction on the load of the motor generator 100 until the temperature detected by the temperature sensor 23 falls below the predetermined threshold $T_2$. When the temperature detected by the temperature sensor 23 falls below the predetermined threshold $T_2$, the control unit 50 stops restriction on the load of the motor generator 100 based on the coil temperature as shown in step S107 in FIG. 5. Then, the control unit 50 returns to step S102 in FIG. 5 to acquire the flow rate of the cooling oil, and determines whether the flow rate of the cooling oil is lower than the predetermined threshold as shown in step S103 in FIG. 5.

Figure 4A:
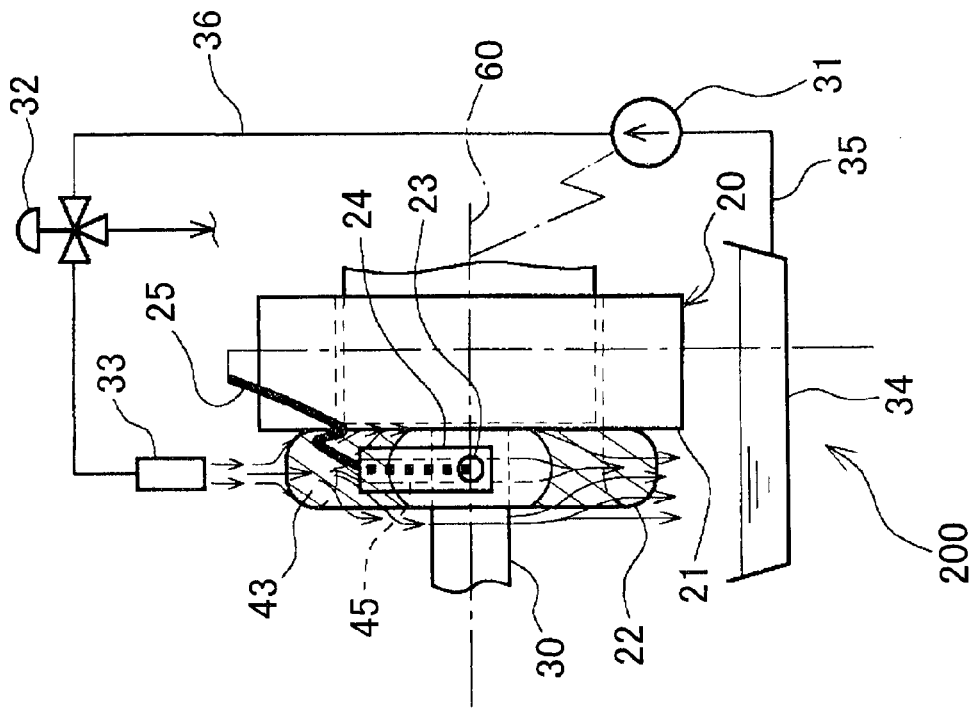
FIG. 4A and FIG. 4B are explanatory drawings showing flows of cooling oil when the flow rate of the cooling oil in the motor generator according to the embodiments of the invention is high.

When the flow rate of the cooling oil is equal to or higher than the predetermined threshold, as in the case described above with reference to FIG. 3A and FIG. 3B, the cooling oil supplied onto the upper peripheral face of the coil end 22 from the cooling oil nozzle 33 drops along the surface of the coil end 22 from the top portion of the coil end 22 as indicated by arrows in FIG. 4A, and also drops along the outer peripheral face of the coil end 22 from the portion near the top portion in the circumferential direction. In the case shown in FIG. 4A, because the flow rate and the flow velocity of the cooling oil are higher than those in the case described with reference to FIG. 3A, the cooling oil flows over a wider region in the direction of the central axis 61 than in the case described with reference to FIG. 3A. Therefore, the region of the end face of the coil end 22, on which the cooling oil flows, is a hatched region 43 that is wider in the direction of the central axis 61 than the region 41 illustrated in FIG. 3A. As illustrated in FIG. 4A, when the flow rate of the cooling oil is equal to or higher than the predetermined threshold, the cooling oil flows from the top to the bottom over most region of the end face of the coil end 22, which is projected in the direction of the rotation axis 60, except both ends of the coil end 22 in the direction of the central axis 61. Then, part of the cooling oil dropped from the surface of the upper portion of the coil end 22, which projects in the direction of the rotation axis 60, flows on the surface of the lower portion of the coil end 22 while cooling the lower portion of the coil end 22, and drops into the oil pan 34.

Part of the cooling oil supplied from the cooling oil nozzle 33 in the direction of a tangent to the outer peripheral face of the coil end 22 linearly proceeds from the outer peripheral face of the coil end 22 in the direction of the tangent to the outer peripheral face of the coil end 22 as indicated by arrows in FIG. 4A without flowing along the outer peripheral face of the coil end 22. In other words, the cooling oil linearly proceeds obliquely downward so as to be further away from the outer peripheral face of the coil end 22. As shown in FIG. 4A, the cooling oil that proceeds linearly from the outer peripheral face of the coil end 22 hits a face of the sensor guide 24, which is on the coil end 22 side. Then, the cooling oil flows downward along the face of the sensor guide 24, which is on the coil end 22 side, and flows on the surface of the temperature sensor 23, and then drops into the oil pan 34.

Figure 4B:
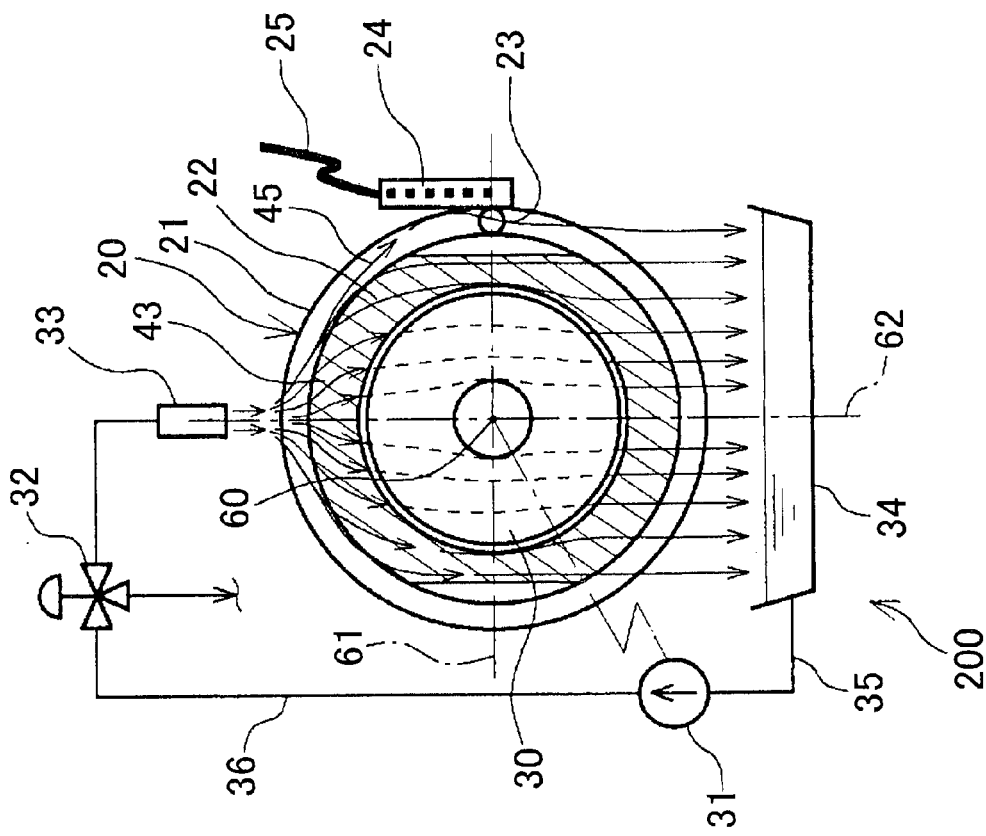

Also, as indicated by arrows in FIG. 4B, the cooling oil supplied onto the top portion of the coil end 22 flows along the surface of the coil end 22. In other words, the flow of the cooling oil is branched off, at the center of the coil end 22 in its thickness direction, into multiple flows aligned in the direction of the rotation axis 60, and the cooling oil flows toward the end face of the coil end 22, which is on the opposite side of the coil end 22 from the stator core 21, and the end face on the stator core 21 side, as in the case described above with reference to FIG. 3B. When the flow rate of the cooling oil is equal to or higher than the predetermined threshold, because the flow velocity of the cooling oil is high, the cooling oil flows downward on the surface of the hatched region 43 that is wider than the region 41 illustrated in FIG. 3B. Then, as in the case described with reference to FIG. 4A, part of the cooling oil proceeds so as to be further away from the outer peripheral face of the coil end 22 from the outer peripheral face of the coil end 22 in the direction of the tangent to the coil end 22. As shown in FIG. 4B, the cooling oil that proceeds so as to be further away from the outer peripheral face of the coil end 22 hits the face of the sensor guide 24, which is on the coil end 22 side. The sensor guide 24 is arranged at the center portion of the coil end 22 in its thickness direction. Then, the cooling oil flows downward along the face of the sensor guide 24, which is on the coil end 22 side. The cooling oil flows on the surface of the temperature sensor 23, and then drops into the oil pan 34. Therefore, the cooling oil is always in contact with the temperature sensor 23, and hence the temperature sensor 23 detects the temperature of the cooling oil. The detected temperature of the cooling oil is usually lower than the temperature of the coil.

As shown in step S108 in FIG. 5, the control unit 50 acquires the temperature detected by the temperature sensor 23. Because the control unit 50 recognizes that the flow rate of the cooling oil is equal to or higher than the predetermined threshold as described above, the control unit 50 determines that the detected temperature is the temperature of the cooling oil. Then, the control unit 50 executes restriction on the load of the motor generator 100 on the basis of the temperature of the cooling oil as shown in steps S109 and S110 in FIG. 5. When restriction on the load of the motor generator 100 is executed on the basis of the temperature of the cooling oil, the control unit 50 restricts the electric power that is supplied to the motor generator 100 or the electric power that is generated by the motor generator 100 with the use of a restriction curve illustrated by a line 6B in FIG. 6. As shown by the line 6B in FIG. 6, when the detected temperature does not exceed a temperature $T_1$, which is a predetermined threshold, the electric power that is supplied to the motor generator 100 or the electric power that is output from the motor generator 100 is allowed up to a full load $P_0$. On the other hand, when the detected temperature exceeds the temperature $T_1$, which is used as the predetermined threshold, the electric power that is supplied to the motor generator 100 or the electric power that is output from the motor generator 100 is reduced from the full load $P_0$ with an increase in temperature as indicated by the line 6B. In this case, a load command value for the motor generator 100 is controlled such that the output of the motor generator 100 does not become equal to or larger than the output restricted by the line 6B in FIG. 6 even when the motor generator 100 is required of a larger output due to an increase in the accelerator operation amount or the vehicle speed. Here, the temperature $T_1$ used as the threshold is a load restriction start temperature based on the coil temperature (threshold for the cooling oil temperature). The threshold $T_1$ for the cooling oil temperature is lower than the load restriction start temperature $T_2$ based on the temperature of the coil as described above. Further, the threshold for the cooling oil temperature may be an upper limit temperature of the cooling oil.

When the control unit 50 starts restriction on the load of the motor generator 100 shown in step S110 in FIG. 5, the control unit 50 returns to step S109 in FIG. 5 to determine whether the temperature detected by the temperature sensor 23 exceeds the predetermined threshold $T_1$. Then, the control unit 50 continues restriction on the load of the motor generator 100 until the temperature detected by the temperature sensor 23 is falls below the predetermined threshold $T_1$. When the temperature detected by the temperature sensor 23 falls below the predetermined threshold $T_1$, the control unit 50 stops restriction on the load of the motor generator 100 based on the temperature of the cooling oil as shown in step S111 in FIG. 5. Then, the control unit 50 returns to step S102 in FIG. 5 to acquire the flow rate of the cooling oil, and determines whether the flow rate of the cooling oil is lower than the predetermined threshold as shown in step S103 in FIG. 5.

As described above, in the motor generator 100 according to the first embodiment, when the flow rate of the cooling oil is low and hence the cooling oil does not contact the temperature sensor 23, the temperature of the coil is detected by the temperature sensor 23. Then, the output of the motor generator 100 is restricted on the basis of the output restriction curve based on the temperature of the coil. On the other hand, when the flow rate of the cooling oil is high and the cooling oil always contacts the temperature sensor 23, the temperature of the cooling oil is detected by the temperature sensor 23. Then, the output of the motor generator 100 is restricted on the basis of the output restriction curve based on the temperature of the cooling oil. Therefore, the temperature of the coil and the temperature of the cooling oil are accurately detected with the use of the single temperature sensor. As a result, it is possible to provide heat protection to both the coil and the cooling oil with a simple structure.

With reference to FIG. 7, a second embodiment of the invention will be described. The second embodiment relates to a case where the flow rate of the cooling oil that is discharged from the cooling oil pump 31 of the motor generator 100 is controlled independently of the rotation of the rotor 30. Note that, the same portions as those in the first embodiment described with reference to FIG. 1 to FIG. 6 will be denoted by the same, reference numerals as those in the first embodiment, and the description thereof will be omitted.

As shown in step S201 in FIG. 7, the control unit 50 determines whether the electric vehicle in which the motor generator 100 is mounted is started. When the electric vehicle is started, the control unit 50 acquires the flow rate of the cooling oil as shown in step S202 in FIG. 7. In the second embodiment, the flow rate of the cooling oil that is discharged from the cooling oil pump 31 is controlled based on a command from the control unit 50. Also, the opening degree of the three-way valve 32 is controlled based on a command from the control unit 50. Therefore, the control unit 50 acquires the flow rate of the cooling oil on the basis of a drive command value for the cooling oil pump 31 and an opening degree command value for the three-way valve 32. Then, as shown in step S203 in FIG. 7, when it is determined, as a result of comparison with a predetermined threshold, that the flow rate is lower than the predetermined threshold, it is determined that the flow rate of the cooling oil is low. In other words, the control unit 50 determines that the cooling oil flows only on the center portion of the coil end 22 as shown in FIG. 3A, and hence the temperature sensor 23 detects the temperature of the coil. Then, the control unit 50 acquires the temperature from the temperature sensor 23 as shown in step S204 in FIG. 7. When the temperature detected by the temperature sensor 23 exceeds a certain threshold, for example, a temperature slightly lower than the upper limit temperature of the coil, the control unit 50 determines that the temperature of the coil end 22 approaches the upper limit temperature. When the control unit 50 determines that the temperature of the coil end 22 approaches the upper limit temperature, the control unit 50 outputs a command to increase the flow rate of the cooling oil that is discharged from the cooling oil pump 31 as shown in step S206 in FIG. 7.

The control unit 50 acquires the flow rate of the cooling oil again as shown in step S207 in FIG. 7. Then, the control unit 50 determines whether the flow rate of the cooling oil is lower than the predetermined threshold as shown in step S208 in FIG. 7. When the flow rate of the cooling oil is lower than the predetermined threshold, the control unit 50 determines that the cooling oil does not contact the temperature sensor 23 as illustrated in FIG. 3A and hence the temperature sensor 23 detects the temperature of the coil. Then, the control unit 50 returns to step S205 in FIG. 7 to compare the detected temperature with the threshold for the coil temperature. When the detected temperature exceeds the threshold, the control unit 50 increases the flow rate of the cooling oil as shown in step S207 in FIG. 7 again. On the other hand, when the temperature detected by the temperature sensor 23 is lower than the threshold for the coil temperature, the control unit 50 reduces the flow rate of the cooling oil as shown in step S212 in FIG.

7. Then, the control unit 50 returns to step S202 in FIG. 7 to acquire the flow rate of the cooling oil again.

On the other hand, when the control unit 50 determines that the flow rate of the cooling oil exceeds the predetermined threshold in step S208 in FIG. 7, the control unit 50 determines that the cooling oil flows in a manner as described with reference to FIG. 4A and FIG. 4B and is always in contact with the temperature sensor 23, and that the temperature sensor 23 detects the temperature of the cooling oil which is lower than the temperature of the coil. Then, the control unit 50 acquires the detected temperature from the temperature sensor 23 in step S209 in FIG. 7, and compares the temperature detected by the temperature sensor 23 and the predetermined threshold for the cooling oil temperature, for example, a temperature slightly lower than the upper limit of the temperature at which the cooling oil does not deteriorate, as shown in step 210 in FIG. 7.

When the detected temperature exceeds the threshold for the cooling oil temperature, the control unit 50 increases the flow rate of the cooling oil as shown in step S211 in FIG. 7. Then, the control unit 50 returns to step S210 in FIG. 7 to compare the temperature of the cooling oil with the threshold for the cooling oil temperature. When the temperature of the cooling oil is lower than the threshold for the cooling oil temperature, the control unit 50 reduces the flow rate of the cooling oil as shown in step S213 in FIG. 7, and then returns to step S202 in FIG. 7 to acquire the flow rate of the cooling oil again.

In the second embodiment, each time the temperature detected by the temperature sensor 23 exceeds the threshold for the coil temperature or the threshold for the cooling oil temperature, the flow rate of the cooling oil is increased to reduce the temperature of the coil or the temperature of the cooling oil. Therefore, it is possible to provide heat protection to both the coil and the cooling oil with a simple structure, that is, with the use of the single temperature sensor 23. Also, each time the temperature detected by the temperature sensor 23 exceeds the threshold for the coil temperature or the threshold for the cooling oil temperature, the flow rate of the cooling oil may be increased to reduce the temperature of the coil or the temperature of the cooling oil and, in addition, the output of the motor generator 100 may be restricted.

The invention claimed is:

1. A rotary electric machine comprising:
   a rotor that is arranged so that an axis of rotation of the rotor extends in a horizontal direction;
   a stator that is provided with an coil end on which coolant is supplied from a position above the coil end in a direction of gravitational force;
   a temperature sensor that is arranged on an outer peripheral face of the coil end at a position near a horizontal plane that includes the axis of rotation of the rotor;
   a sensor guide that is arranged on an outside of the temperature sensor in a radial direction of the rotary electric machine, and that extends upward along the direction of gravitational force; and
   a first control unit that is configured to restrict a load of the rotary electric machine, wherein
   the first control unit restricts the load of the rotary electric machine so that a temperature that is detected by the temperature sensor does not exceed an upper limit temperature of the coil end when a flow rate of the coolant is lower than a predetermined threshold, and
   the first control unit restricts the load of the rotary electric machine so that the temperature that is detected by the temperature sensor does not exceed an upper limit temperature of the coolant when the flow rate of the coolant is equal to or higher than the predetermined threshold.

2. The rotary electric machine according to claim 1, further comprising a second control unit that is configured to increase or decrease a flow rate of the coolant, wherein
   the second control unit increases the flow rate of the coolant when a temperature that is detected by the temperature sensor exceeds the upper limit temperature of the coil end in a state where the flow rate of the coolant is lower than the predetermined threshold, and
   the second control unit increases the flow rate of the coolant when the temperature that is detected by the temperature sensor exceeds the upper limit temperature of the coolant in a state where the flow rate of the coolant is equal to or higher than the predetermined threshold.

3. The rotary electric machine according to claim 1, wherein:
   the sensor guide is arranged at a position apart from the coil end; and
   the sensor guide changes a direction of flow of at least a part of the coolant that flows on the outer peripheral face of the coil end so that the flow of the at least the part of the coolant is directed toward the temperature sensor.

4. The rotary electric machine according to claim 1, wherein the temperature sensor measures at least one of a temperature of a surface of the coil end and a temperature of the coolant.

5. The rotary electric machine according to claim 1, further comprising a coolant nozzle that is configured to supply the coolant to the coil end from the position above the coil end in the direction of gravitational force.

* * * * *